(No Model.) 2 Sheets—Sheet 1.

W. M. BARBER.
WATER HEATER.

No. 393,878. Patented Dec. 4, 1888.

Fig. 1.

WITNESSES:
Phil. C. Dietrich.
C. Sedgwick.

INVENTOR:
W. M. Barber.
BY Munn & Co.
ATTORNEYS.

(No Model.)  W. M. BARBER.  2 Sheets—Sheet 2.
WATER HEATER.

No. 393,878.  Patented Dec. 4, 1888.

WITNESSES:
Phil. C. Dieterich
C. Sedgwick

INVENTOR:
W. M. Barber
BY Munn & Co.
ATTORNEYS.

UNITED STATES PATENT OFFICE.

WILLIAM M. BARBER, OF FITCHBURG, MASSACHUSETTS.

WATER-HEATER.

SPECIFICATION forming part of Letters Patent No. 393,878, dated December 4, 1888.

Application filed June 2, 1888. Serial No. 275,797. (No model.)

*To all whom it may concern:*

Be it known that I, WILLIAM M. BARBER, of Fitchburg, in the county of Worcester and State of Massachusetts, have invented a new and Improved Hot-Water Heater, of which the following is a full, clear, and exact description.

My invention relates to an improvement in hot-water heaters; and has for its object to provide an effective circulation, and also to provide a large amount of water with a maximum area of heating-surface; and the further object of the invention is to provide a heater of simple, durable, and economical construction, which may be safely utilized for heating houses and other structures.

The invention consists in the construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 2:
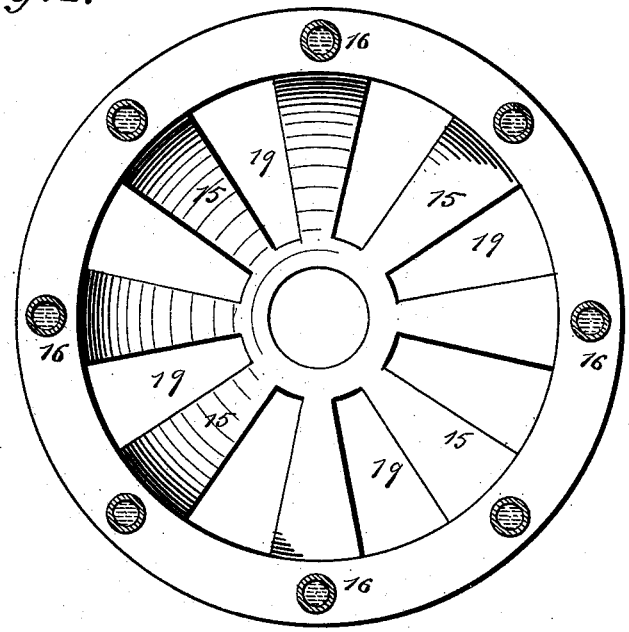
Figure 3:
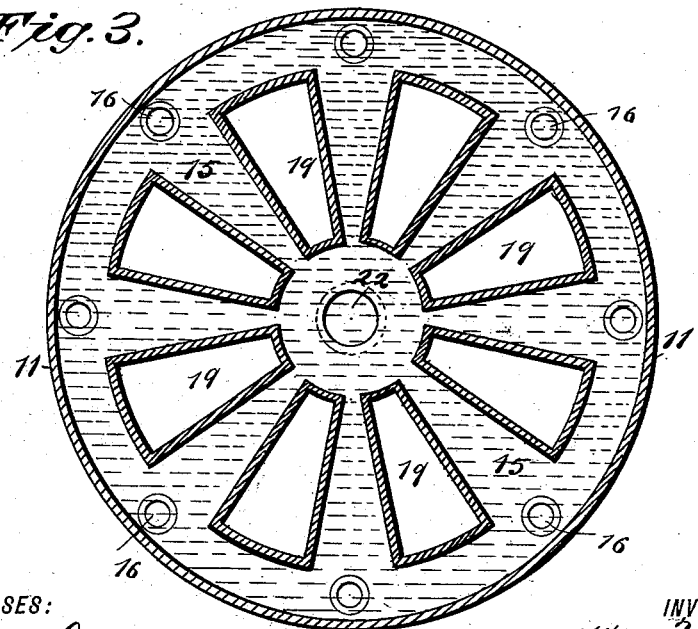

Figure 1 is a central vertical section. Fig. 2 is a transverse section on line x x of Fig. 1, and Fig. 3 is a similar section on line y y of Fig. 1.

In carrying out the invention, grate-bars 10 are secured within a casing, 11, preferably cylindrical in general contour, near the base of the same. The space 12, intervening the bottom of the casing and the grate-bars, is utilized as an ash-pit, and to that end is provided with a draft-opening, 13, ordinarily covered by a door.

A tubular ring, 14, is supported upon the upper face of the grate, connected at the upper side with an overhanging receptacle, 15, through the medium of a series of short vertical tubes, 16, the said tubes being inserted in the upper receptacle 15, in the under face, near the edge.

The inner face of the ring 14 constitutes the fire-pot, and the said ring—likewise the overhanging receptacle—is adapted to contain water, the same being admitted through inlet-pipes 17, projected through the casing into the said ring, as best shown in Fig. 1.

The overhanging water-receptacle 15 represents in cross-section the frustum of a flattened cone. The periphery of the receptacle 15 is preferably made to conform to the contour of the casing. A space, 18, intervenes the periphery of the said water-receptacle 15 and the casing, the periphery of the water-ring being fitted close to the said casing, as best shown in Fig. 1.

The body of the water-receptacle 15 is provided with a series of vertical apertures, 19, radiating from a point near the center, which recesses, extending vertically through the receptacle, are of greater width at their outer than at their inner ends, as best illustrated in Figs. 2 and 3.

The purpose of the apertures 19 is to permit the exit upward of the products of combustion from the fire-pot, and also to divide the bulk of water, in order that the same may be brought at frequent intervals in contact with a heating-surface.

Above the lower conical water shell or receptacle two or more pairs, 20, of similar shells are horizontally supported one above the other, as best shown in Fig. 1.

The shells constituting each pair are so united that their concave faces 21 are contiguous or face inward, and are united one to the other by short vertical tubes, in similar manner to the connection between the lower conical shell or receptacle 15 and the tubular ring.

The several pairs of shell are united to each other and to the lower shell and supported in proper position through the medium of short sections of pipe 22, cast integral with or centrally secured to the convex surface of the opposing pair. By effecting a connection in this manner it will be observed that ample space is obtained for the products of combustion escaping from the fire-pot to circulate around the shells and up through the same.

The lower receptacle or shell 15 and the ring 14 are duplicated at the upper end of the casing, their order being, however, reversed, as best shown in Fig. 1.

The upper ring, 23, which constitutes the head of the casing, is thicker diametrically than the lower ring, the aperture therein being of sufficient size only to accommodate an offtake pipe, 24, through which the products of combustion find an exit.

In the upper face of the ring 23 the several service-pipes 25 are secured.

It will be observed that the products of combustion are effectually brought in contact with the water-shells upon all sides, and that all the water in the entire circulation must pass many times over the fire before it passes out of the boiler.

Having thus described my invention, what I claim as new, and desire to secure by Letters Patent, is—

1. In a hot-water boiler, the combination, with a casing and a tubular water-ring forming the fire-pot, of an apertured water-shell representing in cross-section the frustum of a flattened cone, overhanging the fire-pot and connected with said ring, pairs of conical apertured water-shells having their opposing faces concaved and united, and a pipe connecting the several pairs of conical water-shells and the lower shell, substantially as shown and described.

2. In a hot-water boiler, the combination, with a casing and a tubular water-ring forming the fire-pot, of an apertured water-shell representing in cross-section the frustum of a flattened cone and overhanging the fire-pot, a series of tubes connecting the said shell and ring, pairs of conical apertured water-shells horizontally supported above the fire-pot, having their opposing faces concaved, each pair of conical shells spaced and united by a series of marginal tubes, and a pipe-communication between said pairs of conical shells and the lower shell, substantially as shown and described.

3. In a hot-water boiler, the combination, with a casing, a tubular water-ring forming the fire-pot, and a second diametrically-larger ring constituting the head, of an apertured water-shell representing in cross-section the frustum of a cone and overhanging the fire-pot, a series of tubes connecting said shell and ring, pairs of conical apertured water-shells horizontally supported above the fire-pot, the several shells of a pair spaced and united by a series of marginal tubes, a single shell intervening the upper pair and tubular cap and united to the latter, and pipes connecting the several shells, substantially as and for the purpose specified.

WILLIAM M. BARBER.

Witnesses:
EBENEZER BAILEY,
EDWARD P. DOWNE.